(12) United States Patent
Sakimura et al.

(10) Patent No.: US 11,017,920 B2
(45) Date of Patent: May 25, 2021

(54) VEHICLE WIRE HARNESS FOR SUPPRESSING LOCALIZED UNEVEN PROGRESSION OF WEAR IN CONNECTOR TERMINALS AND MANUFACTURING METHOD OF WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Asako Sakimura, Yokkaichi (JP); Teruyoshi Munekata, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/713,384

(22) Filed: Dec. 13, 2019

(65) Prior Publication Data
US 2020/0294689 A1 Sep. 17, 2020

(30) Foreign Application Priority Data
Mar. 15, 2019 (JP) .............................. JP2019-048953

(51) Int. Cl.
*H01B 7/00* (2006.01)
*H01B 7/18* (2006.01)
(Continued)

(52) U.S. Cl.
CPC ....... *H01B 7/0045* (2013.01); *B60R 16/0215* (2013.01); *H01B 7/1805* (2013.01);
(Continued)

(58) Field of Classification Search
CPC .......................... H01B 7/0045; H01B 7/1805; B60R 16/0215; H01R 13/11; H01R 13/50
(Continued)

(56) References Cited

U.S. PATENT DOCUMENTS

| 2008/0257580 A1* | 10/2008 | Ishimoto | ............... | H01B 7/0045 |
| | | | | 174/68.1 |
| 2011/0251736 A1* | 10/2011 | Lazzara | ............... | B60R 25/045 |
| | | | | 701/2 |

(Continued)

FOREIGN PATENT DOCUMENTS

JP H09-182242 A 7/1997

*Primary Examiner* — Peter G Leigh
(74) *Attorney, Agent, or Firm* — Oliff PLC

(57) ABSTRACT

A wire harness that includes a plurality of wires that are bundled together to form a wire bundle; and a connector that is provided at an end of the wire bundle, the connector including a plurality of connector terminals that are to be respectively mounted to ends of the plurality of wires, and a connector housing configured to hold the plurality of connector terminals in a state in which the plurality of connector terminals are arranged in a direction orthogonal to a terminal axial direction, which is an axial direction of the plurality of connector terminals; and a restraining tape that is to be wrapped around the wire bundle, thereby restraining the plurality of wires so as to restrict relative axial displacement between the plurality of wires.

6 Claims, 5 Drawing Sheets

(51) Int. Cl.
  *H01R 13/11* (2006.01)
  *H02G 1/06* (2006.01)
  *B60R 16/02* (2006.01)
  *H01R 13/50* (2006.01)
  *H02G 3/32* (2006.01)

(52) U.S. Cl.
  CPC ............ *H01R 13/11* (2013.01); *H01R 13/50* (2013.01); *H02G 1/06* (2013.01); *H01R 2201/26* (2013.01); *H02G 3/32* (2013.01)

(58) Field of Classification Search
  USPC .......................................................... 439/527
  See application file for complete search history.

(56) References Cited

U.S. PATENT DOCUMENTS

| | | | |
|---|---|---|---|
| 2013/0115788 A1* | 5/2013 | Broughton | H01R 12/78 439/67 |
| 2013/0180682 A1* | 7/2013 | Imada | H05K 7/20863 165/41 |
| 2015/0246648 A1* | 9/2015 | Steinmair | B60R 16/03 307/9.1 |
| 2018/0166184 A1* | 6/2018 | Hayakawa | H01B 7/0045 |
| 2018/0375256 A1* | 12/2018 | Peterson | H01R 13/60 |

* cited by examiner

VEHICLE WIRE HARNESS FOR SUPPRESSING LOCALIZED UNEVEN PROGRESSION OF WEAR IN CONNECTOR TERMINALS AND MANUFACTURING METHOD OF WIRE HARNESS

BACKGROUND

The present disclosure relates to a vehicle wire harness.

A wire harness is routed in a vehicle such as an automobile in order to establish an electrical connection. In general, such a vehicle wire harness includes a plurality of wires, a restraining tape, and a connector (JP 9-182242A). The plurality of wires are bundled to each other to form a wire bundle. The restraining tape is wrapped around the wire bundle, for example, spirally, thus restraining the plurality of wires. The connector includes a plurality of connector terminals that are mounted to ends of the respective ones of the plurality of wires, and a connector housing that holds the plurality of connector terminals. The connector is fitted to a counterpart connector connected to an electric circuit in the vehicle, thus electrically connecting the plurality of wires to the electric circuit.

JP 9-182242A (FIGS. 1 to 3) is an example of related art.

Each of the connector terminals of the connector in the above-described vehicle wire harness is used in a state in which the connector terminal is fitted to and in contact with a counterpart connector terminal, which is the connector terminal of the counterpart connector. Accordingly, the connector terminal repeatedly slides relative to the counterpart connector terminal by being reciprocated within a minute range in the terminal axial direction by vibration or the like generated while the vehicle is traveling. Consequently, the wear of the connector terminal proceeds, resulting in a reduction in life of the connector. An exemplary aspect of the disclosure provides a wire harness including a plurality of wires that form a wire bundle, and a connector that is to be connected thereto, and with which it is possible to effectively suppress the life of the connector reducing due to the wear of a plurality of connector terminals in the connector.

SUMMARY

Provided is a wire harness that can be used for electrical connection inside a vehicle, the wire harness including: a plurality of wires that are bundled together to form a wire bundle; a connector that is provided at an end of the wire bundle, the connector including a plurality of connector terminals that are to be respectively mounted to ends of the plurality of wires, and a connector housing configured to hold the plurality of connector terminals in a state in which the plurality of connector terminals are arranged in a direction orthogonal to a terminal axial direction, which is an axial direction of the plurality of connector terminals; and a restraining tape that is to be wrapped around the wire bundle, thereby restraining the plurality of wires so as to restrict relative axial displacement between the plurality of wires. The restraining tape includes a tape end at a position that is distant from the connector housing in a length direction of the wire bundle, and the wire bundle includes a wire bundle exposure that is exposed between the connector housing and the tape end without being subjected to restraint by the restraining tape. The plurality of wires include a first wire and a second wire that are respectively located on both outer sides in a specific bending direction, the specific bending direction being orthogonal to the terminal axial direction. The wire harness is configured to be routed inside the vehicle in a state in which a position of the connector is fixed, and bending in the specific bending direction occurs in the wire bundle exposure so as to reduce sag of a first exposure, which is a portion of the first wire that forms a part of the wire bundle exposure, and to increase sag of a second exposure, which is a portion of the second wire that forms a part of the wire bundle exposure, relative to a reference state in which the terminal axial direction and an axial direction of the wire bundle at the tape end are parallel to each other, and the first exposure has a length greater than a length of the second exposure so as to reduce a difference in sag between the second exposure and the first exposure that is caused by a reduction of the sag of the first exposure and an increase of the sag of the second exposure, from the reference state.

According to the present disclosure, a wire harness is provided that includes a plurality of wires that form a wire bundle, and a connector that is to be connected thereto, and with which it is possible to effectively suppress the life of the connector reducing due to the wear of a plurality of connector terminals in the connector.

DETAILED DESCRIPTION OF EMBODIMENTS

Figure 1:
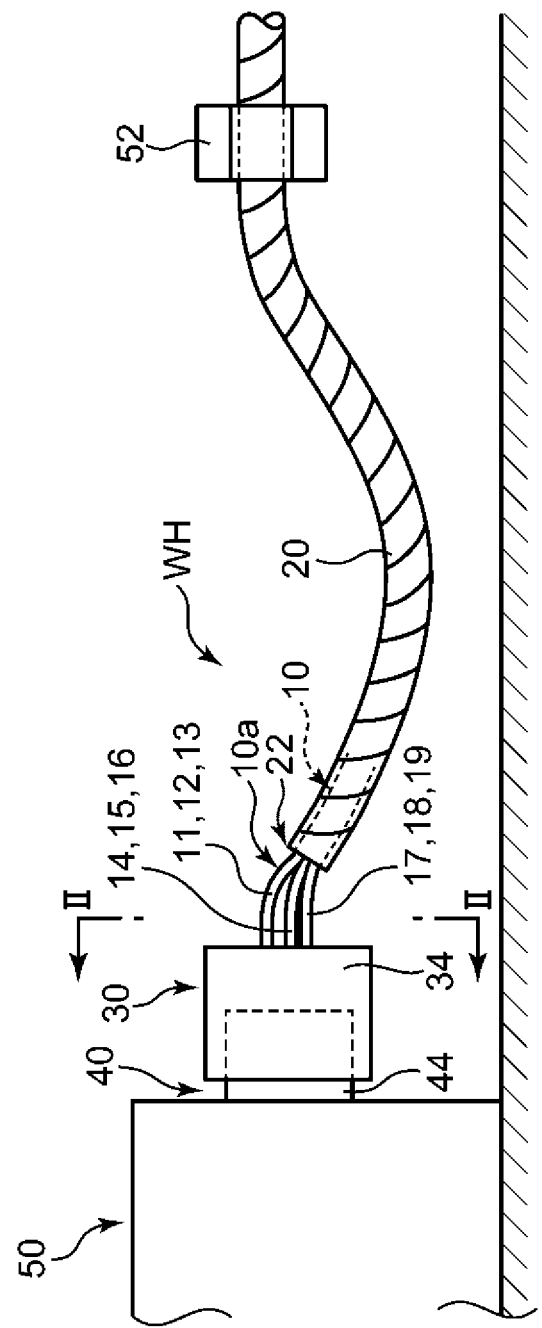
FIG. 1 is a side view showing a routing state of a wire harness according to an embodiment.

Hereinafter, preferred embodiments will be described.

To achieve the above-described object, that is, providing a wire harness including a plurality of wires that form a wire bundle, and a connector that is to be connected thereto, and with which it is possible to effectively suppress the life of the connector reducing due to the wear of a plurality of connector terminals in the connector, the present inventors focused on the fact that there is unevenness in wear between the plurality of connector terminals. That is, in many wire harnesses, all connector terminals do not evenly wear out, but some connector terminals tend to wear out earlier than the other connector terminals. By suppressing such localized uneven progression of wear in the connector terminals, the reduction in life in the connector as a whole can be effectively suppressed.

Then, as a result of continued studies on the causes of the uneven wear, the present inventors have found that the routing configuration of a wire harness, in particular, the state of bending of a wire bundle in the vicinity of the connector significantly affects the promotion of wear. Specifically, when a restraining tape is wrapped around a wire bundle formed by a plurality of wires, a tape end, which is an end of the restraining tape, is located at a position slightly distant from the connector connected to ends of the plurality of wires, and the wire bundle between the tape end and the connector is exposed without being restrained. When the wire harness is routed in such a state in which bending deformation has occurred in the wire bundle in a region where the wire bundle is exposed, that is, a region where the individual wires that form the wire bundle are not restrained by the restraining tape, the sag of a first wire located on the outer side in the curvature radius direction for that bending deformation is smaller than the sag of a second wire located on the inner side, and a correspondingly larger tension is likely to act on the first wire than on the second wire when an external force (in particular, an external force when the wire harness is resonating) generated by vibration or the like while the vehicle is travelling is applied to the wire bundle. Such a difference in tension makes the sliding distance, in the terminal axial direction, of the first connector terminal connected to the first wire from a counterpart connector terminal larger than the sliding distance, in the terminal axial direction, of the second connector terminal connected to the second wire from a counterpart connector terminal, thus causing the wear of the first connector terminal to progress more significantly than the wear of the second connector terminal. In other words, by reducing the difference between tensions that act on the first and second wires due to bending deformation, that is, the difference between the sags of the first and second wires, it is possible to suppress uneven progression of wear in the first connector terminal.

From such a viewpoint, a wire harness capable of achieving the above-described object is provided as will be discussed below.

(1) Provided is a wire harness that can be used for electrical connection inside a vehicle, the wire harness including: a plurality of wires that are bundled together to form a wire bundle; a connector that is provided at an end of the wire bundle, the connector including a plurality of connector terminals that are to be respectively mounted to ends of the plurality of wires, and a connector housing configured to hold the plurality of connector terminals in a state in which the plurality of connector terminals are arranged in a direction orthogonal to a terminal axial direction, which is an axial direction of the plurality of connector terminals; and a restraining tape that is to be wrapped around the wire bundle, thereby restraining the plurality of wires so as to restrict relative axial displacement between the plurality of wires. The restraining tape includes a tape end at a position that is distant from the connector housing in a length direction of the wire bundle, and the wire bundle includes a wire bundle exposed portion that is exposed between the connector housing and the tape end without being subjected to restraint by the restraining tape. The plurality of wires include a first wire and a second wire that are respectively located on both outer sides in a specific bending direction that is orthogonal to the terminal axial direction. The wire harness is configured to be routed inside the vehicle in a state in which a position of the connector is fixed, and bending in the specific bending direction occurs in the wire bundle exposed portion so as to reduce sag of a first exposed portion, which is a portion of the first wire that constitutes a part of the wire bundle exposed portion, and to increase sag of a second exposed portion, which is a portion of the second wire that constitutes a part of the wire bundle exposed portion, relative to a reference state in which the terminal axial direction and an axial direction of the wire bundle at the tape end are parallel to each other, and the first exposed portion has a length greater than a length of the second exposed portion so as to reduce a difference in sag between the second exposed portion and the first exposed portion that is caused by a reduction of the sag of the first exposed portion and an increase of the sag of the second exposed portion, from the reference state.

Here, the "sags" of the first and second exposed portions refer to the differences between the respective actual lengths (lengths along the wires) of the first and second exposed portions and the respective lengths (i.e., minimum lengths) of the first and second exposed portions in a state in which the first and second exposed portions are stretched in a straight line from the corresponding connector terminals to the tape end.

According to the wire harness, of the first and second wires located on both outer sides in the specific bending direction, the first exposed portion of the first wire located on the outer side, in the curvature radius direction, of the wire bundle exposed portion is provided with a length greater than the length of the second exposed portion of the second wire, and it is thus possible to reduce the difference between the sags of the second exposed portion and the first exposed portion that is caused by a reduction in the sag of the first exposed portion and an increase in the sag of the second exposed portion, from the reference state, independently of the bending deformation of the wire bundle exposed portion. This can reduce the difference between the tension generated in the first wire and the tension generated in the second wire when an external force generated by vibration or the like while the vehicle is traveling acts on the wire harness, thus suppressing the terminal sliding distance, in the terminal axial direction, of the connector terminal connected to the first wire from the connector terminal of the counterpart connector. That is, it is possible to suppress uneven progression of wear in the connector terminals.

(2) The plurality of wires may further include at least one intermediate wire located between the first wire and the second wire in the specific bending direction. In this case, an intermediate wire exposed portion, which is a portion of the intermediate wire that constitutes a part of the wire bundle exposed portion, preferably has a length less than or equal to the length of the first exposed portion. The reason is that, as the wire bundle exposed portion undergoes bending deformation, the sag of the first exposed portion decreases more significantly than the sag of the intermediate wire exposed portion.

(3) The present disclosure includes a mode in which the plurality of connector terminals are arranged in a plurality of stages aligned in the specific bending direction, and the connector terminals are respectively disposed at a plurality of positions aligned in a direction orthogonal to both the specific bending direction and the terminal axial direction in each of the plurality of stages. In this mode, the first wire corresponds to a wire connected to each of the connector terminals included in one of the plurality of stages that is located outermost in a curvature radius direction of the wire bundle exposed portion for bending in the specific bending direction, and the second wire corresponds to a wire connected to each of the connector terminals included in one of the plurality of stages that is located innermost in the curvature radius direction.

(4) Although the specific bending direction in the wire bundle exposed portion is not particularly limited, the above-described effect, that is, the effect of suppressing localized uneven progress of wear in the connector terminals becomes significant when the wire harness is configured to be routed in a state in which an intermediate portion of the wire harness causes downward bending in the wire bundle exposed portion by sagging downward by its own weight. The reason is that a large tension is generated in the wire bundle exposed portion by the gravity acting on the above-described intermediate portion (sag portion) of the wire harness. In this case, the specific bending direction is a vertical direction, the first wire corresponds to one of the plurality of wires that is located uppermost, and the second wire corresponds to one of the plurality of wires that is located lowermost.

(5) Although the position at which the wire harness is routed inside the vehicle is not particularly limited, the technique according to the present disclosure is particularly effective when the wire harness is routed such that the wire bundle exposed portion is located inside an engine room, which is under a high-temperature environment in the vehicle. In this mode, it is desirable to minimize the length of the wire bundle exposed portion in order to protect the plurality of wires from the high-temperature environment. According to the technique of the present disclosure, the length of the first exposed portion, on which a large tension is likely to act, is made relatively large with respect to the length of the second exposed portion, thus making it possible to suppress uneven progression of wear in the connector terminal included in the plurality of connector terminals that is connected to the first wire, while protecting the plurality of wires by suppressing the overall length of the wire bundle exposed portion.

(6) An electrical connection device for establishing an electrical connection using the wire harness inside a vehicle is also provided. The device includes the above-described wire harness; a connector holding portion configured to hold the connector of the wire harness or a counterpart connector that is to be coupled to the connector so as to fix a position of the connector; and a wire bundle holding portion configured to hold the wire bundle at a position distant from the connector holding portion in a state in which bending in the specific bending direction occurs in the wire bundle exposed portion so as to reduce sag of a first exposed portion, which is a portion of the first wire that constitutes a part of the wire bundle exposed portion, and to increase sag of a second exposed portion, which is a portion of the second wire that constitutes a part of the wire bundle exposed portion, from the reference state of the wire harness.

With the electrical connection device, the difference between tensions that may be respectively generated in the first wire and the second wire located on both sides in a specific bending direction can be kept low, even though the wire harness is routed in a state in which bending in the specific bending direction occurs in the wire bundle exposed portion.

(7) In the above-described electrical connection device as well, the plurality of wires may include at least one intermediate wire located between the first wire and the second wire in the specific bending direction. In this case, it is preferable that an intermediate wire exposed portion of the intermediate wire that constitutes a part of the wire bundle exposed portion has a length less than or equal to the length of the first exposed portion.

(8) The above-described electrical connection device also includes a mode in which the plurality of connector terminals are arranged in a plurality of stages aligned in the specific bending direction, and the connector terminals are respectively disposed at a plurality of positions aligned in a direction orthogonal to both the specific bending direction and the terminal axial direction in each of the plurality of stages. In this mode, the first wire corresponds to a wire connected to each of the connector terminals disposed in one of the plurality of stages that is located outermost in a curvature radius direction of the wire bundle exposed portion, and the second wire corresponds to a wire connected to each of the connector terminals disposed in one of the plurality of stages that is located innermost in the curvature radius direction.

(9) The above-described electrical connection device is particularly effective in a mode in which the wire harness is held by the connector holding portion and the wire bundle holding portion so as to apply downward bending to the wire bundle exposed portion by the intermediate portion of the wire bundle sagging downward by its own weight, that is, a mode in which a large tension may act on the wire bundle exposed portion by the gravity acting on the intermediate portion. In this mode, the first wire corresponds to one of the plurality of wires that is located uppermost, and the second wire corresponds to one of the plurality of wires that is located lowermost.

(10) The electrical connection device is particularly effective when the connector holding portion holds the connector or the counterpart connector such that the wire bundle exposed portion is located inside an engine room in the vehicle.

(11) A method for routing a wire harness inside a vehicle is also provided. This method includes the steps of; preparing the above-described wire harness; and routing the wire harness inside the vehicle in a state in which a position of the connector in the wire harness is fixed, and bending occurs in the wire bundle exposed portion in the specific bending direction so as to reduce sag of a first exposed portion serving as the exposed portion of the first wire, and to increase sag of a second exposed portion serving as the exposed portion of the second wire, from the reference state.

(12) The above-described routing method is particularly effective in a mode in which, in the step of routing the wire harness, the wire harness is routed in a state in which the first wire is located uppermost and the second wire is located lowermost of the plurality of wires, and downward bending deformation occurs in the first exposed portion and the second exposed portion by the intermediate portion of the wire harness sagging downward by its own weight, that is, a mode in which a large tension may act on the wire bundle exposed portion by the gravity acting on the intermediate portion.

(13) The above-described routing method is particularly effective in a mode in which, in the step of routing the wire harness, the wire harness is routed such that the wire bundle exposed portion is located inside an engine room of the vehicle.

Hereinafter, a preferred embodiment of the wire harness will be described with reference to the drawings.

FIG. 1 shows a wire harness WH according to an embodiment, and an electrical connection device of a vehicle including the wire harness WH. The wire harness WH according to this embodiment includes a plurality of wires, a restraining tape 20, and a connector 30, and is routed inside the engine room of the vehicle. In addition to the wire harness WH, the electrical connection device includes a connector holding portion and a wire bundle holding portion, which will be described below.

Plurality of Wires

The plurality of wires in this embodiment are a total of nine wires, namely, wires 11, 12, 13, 14, 15, 16, 17, 18, and 19. Each of the plurality of wires 11 to 19 can be formed by an insulated wire, for example. The insulated wire includes a central conductor and an insulating covering that covers the central conductor. The plurality of wires 11 to 19 are bundled together, thus forming a wire bundle 10.

The specific numbers of the plurality of wires and the plurality of connector terminals connected thereto are not limited. The wire harness disclosed in the present application widely encompasses wire harnesses in which connector terminals and wires are arranged at plurality of different positions in a specific bending direction. For example, the wire harness may be a wire harness including only the first and second wires, without including the intermediate wire. Alternatively, in a wire harness in which three or more connector terminals and wires connected thereto are irregularly arranged, uneven progression of wear in the connector terminal connected to the first wire can also be suppressed by providing the above-described difference between the length of the first exposed portion and the length of the second exposed portion of the first wire and the second wire, which are located on both outer sides in the specific bending direction, of the plurality of wires.

Restraining Tape

The restraining tape 20 is wrapped around the wire bundle 10, for example, spirally, thus maintaining the bound state of the plurality of wires 11 to 19. The restraining tape 20 is formed by, for example, an adhesive tape, and restrains the plurality of wires 11 to 19 so as to restrict the relative axial displacement between the plurality of wires 11 to 19. Here, "to restrict the relative axial displacement" means to prevent the plurality of wires 11 to 19 from freely moving relative to each other in the axial direction thereof. Therefore, a mode "to restrict the relative axial displacement" of the plurality of wires 11 to 19 is not limited to a mode in which the relative displacement is completely prevented, but also includes a mode in which the relative displacement is suppressed to such a degree that a slight relative displacement is allowed.

Connector

The connector 30 is provided at an end of the wire bundle 10, and is fitted to a counterpart connector 40 provided on an engine peripheral device (e.g., an engine control unit) 50 installed inside the engine room, thus electrically connecting an electric circuit incorporated in the engine peripheral device 50 to the plurality of wires 11 to 19 that form the wire bundle 10. Accordingly, the engine peripheral device 50 according to this embodiment constitutes a connector holding portion that holds the counterpart connector 40 and also the connector 30 coupled thereto.

Figure 2:
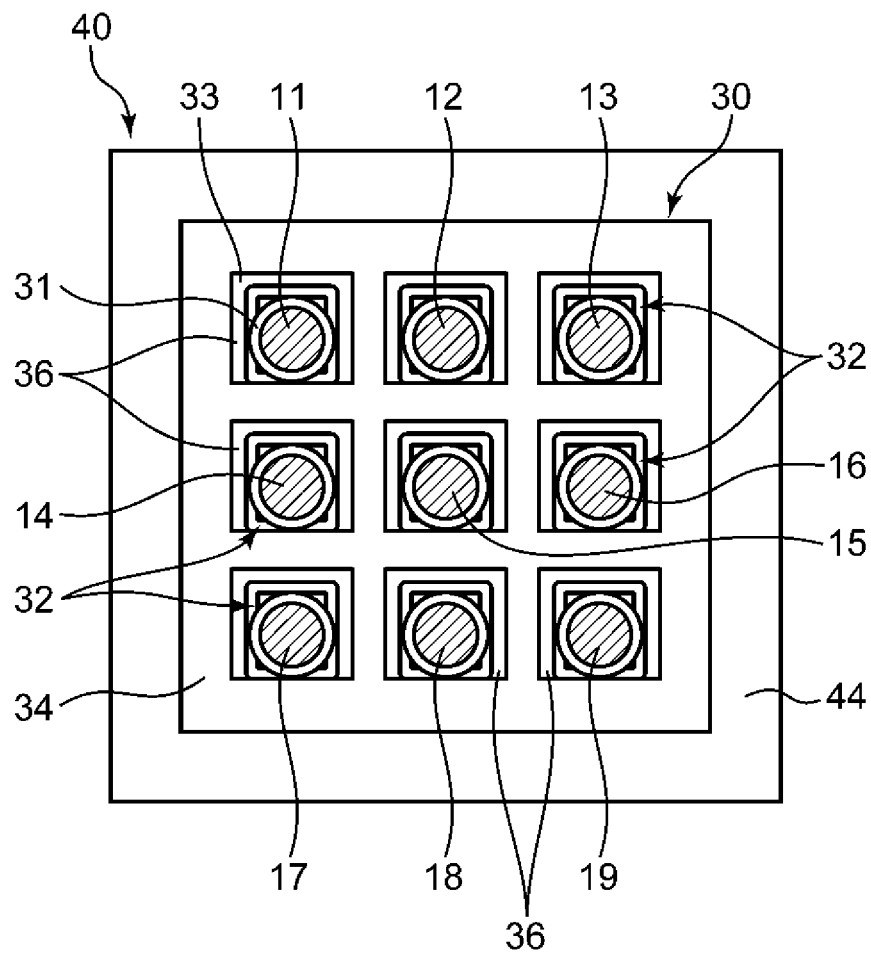
FIG. 2 is a front view showing a cross section taken along the line II-II in FIG. 1.
Figure 3:
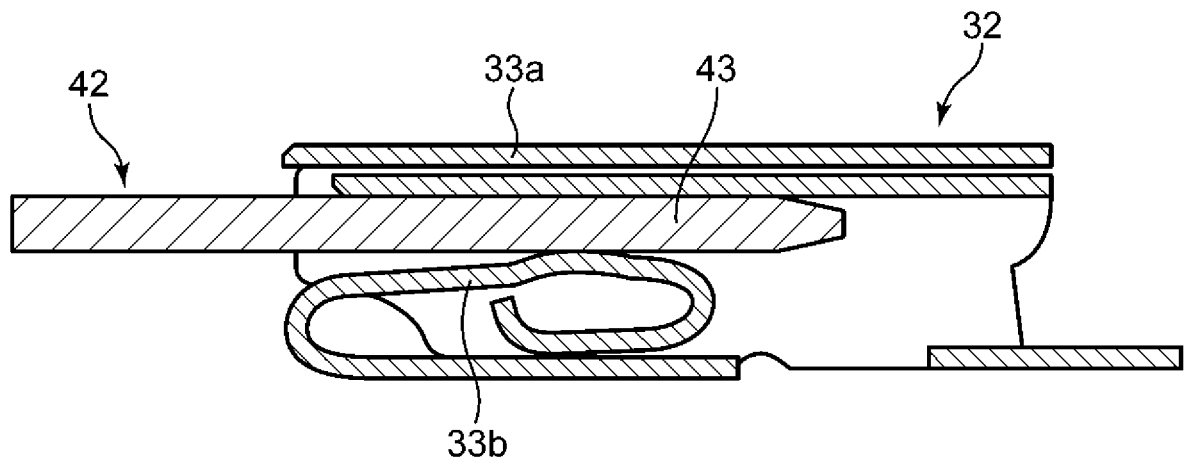
FIG. 3 is a cross-sectional side view showing a fitted state between a connector terminal and a counterpart connector terminal of the wire harness shown in FIG. 1.

The connector 30 includes a plurality of connector terminals 32 as shown in FIGS. 2 and 3, and a connector housing 34. The plurality of connector terminals 32 are each formed of a conductive material, for example, a single metal plate, and are respectively mounted to ends of the plurality of wires 11 to 19. The connector housing 34 is formed of a synthetic resin material, for example, an insulating material, and holds the plurality of connector terminals 32 together.

The counterpart connector 40 also includes a plurality of connector terminals (hereinafter referred to as "counterpart connector terminals") 42 as shown in FIG. 3, and a connector housing (hereinafter referred to as "counterpart connector housing") 44 that holds the plurality of connector terminals 42 together. The connector 30 is coupled to the counterpart connector 40 such that the plurality of connector terminals 32 are respectively fitted to the plurality of counterpart connector terminals 42.

Each of the plurality of connector terminals 32 includes, as one piece, a wire crimped portion (not shown) and an electrical contact portion 33 shown in FIG. 3.

The wire crimped portion is crimped to an end of the corresponding one of the plurality of wires 11 to 19, thus coming into contact with the conductor portion so as to be electrically conductively connected to the conductor included in that wire. The wire crimped portion includes a wire barrel that is crimped to the conductor exposed, for example, at an end of the wire so as to embrace the conductor, and an insulation barrel that is crimped to a portion of the insulating covering that is located adjacent to the exposed conductor so as to embrace that portion.

The electrical contact portion 33 is a portion capable of being electrically conductively connected to the counterpart connector terminal 42 by being fitted in contact with the electrical contact portion 43 of the counterpart connector terminal 42. In this embodiment, the electrical contact portion 43 of the counterpart connector terminal 42 is a male electrical contact portion having the shape of, for example, a tab, and the electrical contact portion 43 of the electrical contact portion 33 is a female electrical contact portion configured to receive the male electrical contact portion. Specifically, the electrical contact portion 33 includes, as one piece, a main body 33a having the shape of a rectangular tube that is open in a terminal axial direction, which is the axial direction (lateral direction in FIG. 3) of the connector terminal 32, and a contact spring piece 33b disposed inside the main body 33a. The contact spring piece 33b undergoes deflection deformation outward (downward in FIG. 3) so as to allow insertion of the male electrical contact portion 43 into the main body 33a, and is connected to the electrical contact portion 43 by the repulsive force.

The connector housing 34 includes a plurality of terminal accommodating chambers 36 for respectively accommodating the plurality of (nine in this embodiment) connector terminals 32 respectively mounted to the wires 11 to 19. The plurality of terminal accommodating chambers 36 are respectively formed at a plurality of positions aligned in two directions that are orthogonal to the terminal axial direction, nine positions aligned in the vertical direction and the lateral direction as shown in FIG. 2 in this embodiment. A lance (not shown) is formed inside each of the plurality of terminal accommodating chambers 36, and the terminal connector 32 is locked by the lance.

Accordingly, the plurality of connector terminals 32 according to this embodiment are arranged in a plurality of stages (an upper stage, a middle stage, and a lower stage) aligned in the vertical direction, and the connector terminals 32 are respectively disposed at a plurality of positions (three positions in this embodiment) aligned in the lateral direction in each of the plurality of stages. More specifically, as shown in FIG. 2, in a state in which the connector terminals 32 mounted to ends of the wires 11, 12, and 13 of the wires 11 to 19 are arranged in the upper stage, the connector terminals 32 mounted to ends of the wires 14, 15, and 16 are arranged in the middle stage, and the connector terminal 32 mounted to ends of the wires 17, 18, and 19 are arranged in the lower stage, these connector terminals 32 are held inside the respective corresponding terminal accommodating chambers 36.

The specific structure of each of the plurality of wires and the plurality of connector terminals is not limited. For example, each of the plurality of connector terminals may be a male terminal, rather than a female terminal.

Tape End

The restraining tape 20 includes a tape end 22 at a position distant from the connector housing 34 by a predetermined length in the length direction of the wire bundle 10. The tape end 22 is one of opposite ends of the restraining tape 20 in the longitudinal direction that is located closer to the connector housing 34. Accordingly, the wire bundle 10 includes a wire bundle exposed portion 10a (wire bundle exposure) that is exposed between the connector housing 34 and the tape end 22 without being subjected to restraint by the restraining tape 20.

Routing of Wire Harness

The wire harness WH is routed inside the engine room in a state in which bending in a specific bending direction (vertical direction in this embodiment) occurs in the wire bundle exposed portion 10a. Specifically, the wire harness WH is routed in the following states (a) to (c).

(a) The connector 30 and the counterpart connector 40 are held by the engine peripheral device 50 such that the terminal axial direction coincides with the horizontal direction. Note that the counterpart connector 40 may be integrated as one piece with the engine peripheral device 50, for example.

(b) The wire bundle 10 of the wire harness WH and the surrounding restraining tape 20 are held by a clamp 52 serving as the wire bundle holding portion, while being fixed in an orientation substantially horizontal to another device or the body of the vehicle, at a position distant from the engine peripheral device 50 in a direction (lateral direction in FIG. 1) parallel to the terminal axial direction.

(c) An intermediate portion of the wire harness WH sags downward by its own weight between the engine peripheral device 50 and the clamp 52, as a result of which downward bending occurs in the wire bundle exposed portion 10a.

That is, for the wire harness WH of this embodiment, the wire harness WH is routed in a state in which bending occurs in the wire bundle exposed portion 10a so as to reduce the sag of a portion (first exposed portion/first exposure), constituting a part of the wire bundle exposed portion 10a, of the wires 11, 12, and 13 (first wires) arranged in the uppermost stage (i.e., the stage located outermost in the curvature radius direction for the bending of the wire bundle exposed portion 10a) of the plurality of wires 11 to 19, and to increase the sag of a portion (second exposed portion/second exposure), constituting a part of the wire bundle exposed portion 10a, of the wires 17, 18, and 19 (second wires) arranged in the lowermost stage (i.e., the stage located innermost in the curvature radius direction) (i.e., the bending occurs downwardly), relative to a reference state in which the terminal axial direction and the axial direction of the wire bundle 10 at the tape end 22 are parallel to each other.

Here, the "sags" of the first and second exposed portions refer to the differences between the respective actual lengths L1 and L2 of the first and second exposed portions and the respective lengths (i.e., minimum lengths) L1$o$ and L2$o$ of the first and second exposed portions in a state in which the first and second exposed portions are stretched in a straight line from the connector terminal 32 to the tape end 22. That is, the respective sags $\delta 1$ and $\delta 2$ of the first and second exposed portion can be expressed by: $\delta 1 = L1 - L1o$ and $\delta 2 = L2 - L2o$.

The specific bending direction according to the present disclosure is not limited to the vertical direction. For example, in a wire harness that is routed in a state in which bending in the horizontal direction occurs in the wire bundle exposed portion, the difference between the degree of wear of the connector terminal connected to the first wire and the degree of wear of the connector terminal connected to the second wire can also be reduced by providing the above-described length difference for the first exposed portion and the second exposed portion of the first wire and the second wire located on both outer sides in the horizontal direction (specific bending direction).

The specific configurations of the connector holding portion and the wire bundle holding portion included in the electrical connection device are not limited. The connector holding portion may directly hold the connector 30, rather than indirectly holding the connector 30 by holding the counterpart connector 40, for example, as in the case of the engine peripheral device 50 shown in FIG. 1. The portion where the wire bundle holding portion holds the wire bundle of the wire harness is also not particularly limited. The wire bundle holding portion may hold the wire bundle at a position closer than the sag portion of the wire harness WH, without the sag portion interposed in between, as shown in FIG. 1, for example. The wire bundle holding portion is not limited to a clamp that clamps the wire bundle, and may be a grommet disposed extending through the inner wall of the vehicle, for example.

The position at which the wire harness is routed inside the vehicle is not limited to a position inside the engine room. However, the technique according to the present disclosure is particularly effective when the wire harness is routed such that the wire bundle exposed portion is located inside the engine room, which is under a high-temperature environment in the vehicle, that is, when it is required that the wire bundle exposed portion, which is the exposed portion of the wire bundle, is kept as small as possible in order to protect the wire bundle from the high-temperature environment. This also applies to a mode in which the wire bundle exposed portion of the wire harness is disposed inside the engine room, but a predetermined position other than the wire bundle exposed portion is disposed outside the engine room.

Feature of Wire Harness

Furthermore, as a feature of the wire harness WH, the first exposed portion (the portion of the wires 11, 12, and 13 that is exposed between the connector housing 34 and the tape end 22 in this embodiment) has a length L1 that is greater than a length L2 of the second exposed portion so as to reduce the difference ($=\delta 2 - \delta 1$) in sag between the second exposed portion and the first exposed portion that is caused by a reduction of the sag $\delta 1$ of the first exposed portion and an increase of the sag $\delta 2$ of the second exposed portion (the portion of the wires 17, 18, and 19 that is exposed between the connector housing 34 and the tape end 22 in this embodiment) by the bending of the wire bundle exposed portion 10a, from the reference state. In other words, a difference $\Delta L$ ($= L1 - L2 > 0$) is provided between the length L1 of the first exposed portion and the length L2 of the second exposed portion. Although the difference $\Delta L$ can be set as appropriate according to the specifications of the wire harness, the difference $\Delta L$, in general, is preferably 1 mm or more, in order to effectively reduce the sag difference. When the difference $\Delta L$ is excessively large, tension may be generated unevenly in the second exposed portion, contrary to the foregoing description. Therefore, the upper limit of the difference ΔL is preferably set from such a viewpoint. In general, the difference ΔL is preferably 4 mm or less.

That is, the wire harness WH is routed by a method including the steps of; preparing a wire harness WH, that is, a wire harness WH in which a difference ΔL is provided between the length L1 of the first exposed portion and the length L2 of the second exposed portion; and routing the wire harness WH inside a vehicle in a state in which the position of the connector 30 in the wire harness WH is fixed, and bending occurs in the wire bundle exposed portion 10a in the vertical direction, which is the specific bending direction, so as to reduce the sag δ1 of the first exposed portion, and to increase the sag of the second exposed portion serving as the exposed portion of the second wire, from the reference state.

Effects of Wire Harness, Etc.

With such a wire harness WH and a method for routing the same, of the first and second wires located on both outer sides in the specific bending direction (vertical direction in this embodiment), the first exposed portion of the first wire (wires 11 to 13) located on the outer side in the curvature radius direction for the bending of the wire bundle exposed portion 10a is provided with the length L1 that is greater than the length L2 of the second exposed portion of the second wire (wires 17 to 19), thus making it possible to reduce the difference (=δ1−δ2) in sag between the first exposed portion and the second exposed portion that is caused by a reduction of the sag δ1 of the first exposed portion and an increase of the sag δ2 of the second exposed portion, from the reference state, independently of the bending deformation of the wire bundle exposed portion 10a. This can reduce the difference between the tension generated in the first wire and the tension generated in the second wire when an external force generated by vibration or the like while the vehicle is traveling acts on the wire harness WH, thus making it possible to suppress the terminal sliding distance, in the terminal axial direction, of the connector terminal 32 connected to the first wire relative to the counterpart connector terminal 42. Thus, it is possible to suppress localized uneven progression of wear of the plurality of connector terminals 32.

Figure 4:
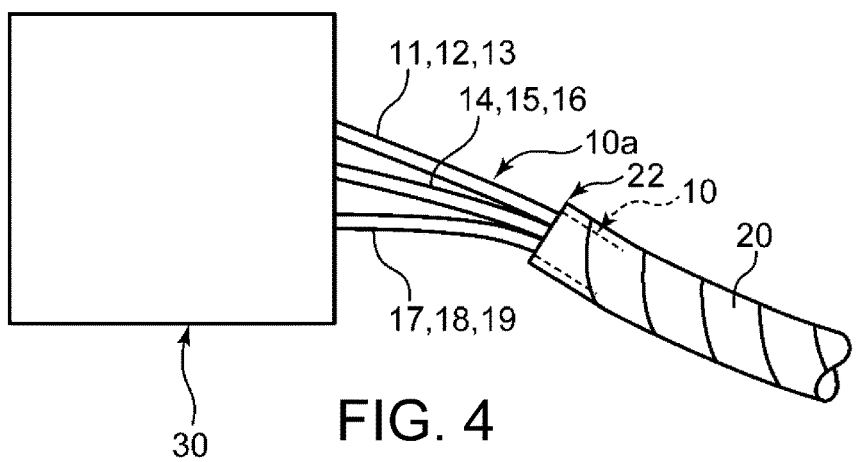
FIG. 4 is a side view showing a bent deformed state of a wire bundle exposed portion in a wire harness according to a comparative example.
Figure 5:
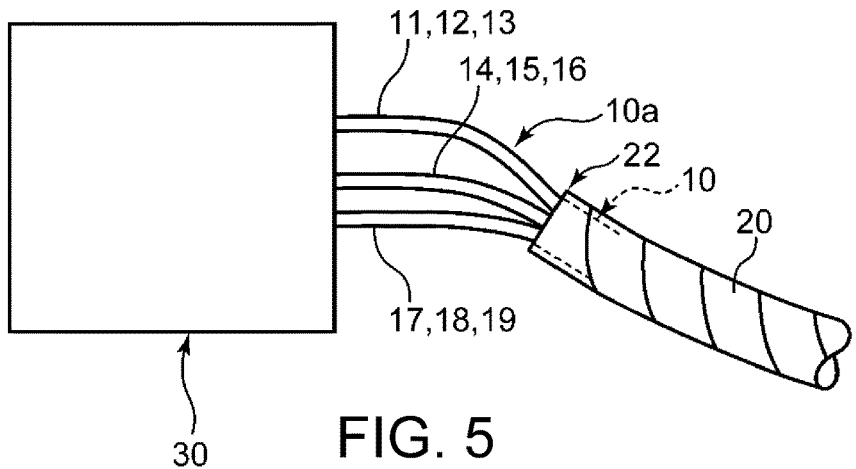
FIG. 5 is a side view showing a bent deformed state of a wire bundle exposed portion in the wire harness shown in FIG. 1.

This effect will be described based on a comparison with a comparative example as shown in FIG. 4. In a wire harness according to this comparative example, the respective exposed portions (i.e., the portions constituting the wire bundle exposed portion 10a) of the plurality of wires 11 to 19 of the wire harness WH shown in FIGS. 1 to 3 are provided with an equal length. That is, no difference is provided between the length L1 of the first exposed portion and the length L2 of the second exposed portion (ΔL=0).

In this comparative example, when downward bending is applied to the wire bundle exposed portion 10a in the same manner as in the embodiment, the sag δ1 of the first exposed portion serving as the exposed portion of the first wire (the wires 11 to 13 in the uppermost stage) significantly decreases (i.e., the first exposed portion is close to a state in which it is stretched in a straight line) as shown in FIG. 4. Conversely, the sag δ2 of the second exposed portion serving as the exposed portion of the second wire (wires 17 to 19 in the lowermost stage) significantly increases (i.e., the sag of the second exposed portion significantly increases). When vibration (in particular, vibration at a frequency close to the resonance frequency of the wire harness) generated by traveling of the vehicle or the like is applied to the wire harness in such a state, the tension in the first exposed portion significantly increases, whereas the tension in the second exposed portion remains low. Consequently, the terminal sliding distance, which is a sliding stroke, in the terminal axial direction, of the connector terminal 32 connected to the first exposed portion relative to the counterpart connector terminal 42, significantly increases. This makes the uneven progression of wear in the connector terminal 32 prominent.

In contrast, in the wire harness WH according to the embodiment, the difference ΔL is provided in advance between the lengths L1 and L2 of the first and second exposed portions. Accordingly, the difference (=δ1−δ2) between the sags δ1 and δ2 is kept small as compared with the conventional wire harness, even though bending of the wire bundle exposed portion 10a is accompanied by a reduction of the sag δ1 of the first exposed portion and an increase of the sag δ2 of the second exposed portion. This can reduce the difference between the terminal sliding distance of the connector terminal 32 connected to the first exposed portion and the terminal sliding distance of the connector terminal 32 connected to the second exposed portion, thus making it possible to effectively suppress uneven progression of wear in the connector terminal 32 connected to the first exposed portion.

Note that a length Lm of the exposed portion (intermediate wire exposed portion that constitutes a part of the wire bundle exposed portion 10a) of each of the wires 14, 15, and 16 of the plurality of wires 11 to 19 that serve as the intermediate wires located between the first wire and the second wire is not particularly limited. However, it is preferable that the length Lm is set to be a length less than or equal to the length L1 of the first exposed portion (Lm≤L1). The reason is that, as the wire bundle exposed portion undergoes bending deformation, the sag δ1 of the first exposed portion decreases in a larger degree than the sag δm of the intermediate wire exposed portion. Similarly, the length Lm of the intermediate wire exposed portion is preferably set to be a length greater than or equal to the length L2 of the second exposed portion (L2≤Lm). The reason is that, as the wire bundle exposed portion undergoes bending deformation, the sag δm of the intermediate wire exposed portion decreases in a larger degree than the sag δ2 of the second exposed portion.

EXAMPLES

Example 1

In the wire harness WH routed as shown in FIG. 1, vibration was applied to the wire harness WH under a plurality of conditions with varying differences ΔL (=L1−L2) between the length L1 of the first exposed portion (exposed portions of the wires 11 to 13) and the length L2 of the second exposed portion (exposed portions of the wires 17 to 19), and the terminal sliding distances resulting therefrom of the connector terminal 32 connected to the first exposed portion were measured. The measurement conditions are as follows.

(a) The length L2 of the second exposed portion: 30 mm
(b) The length L1 of the first exposed portion: L2+ΔL
(c) The length difference ΔL: 0 (no difference), 1 mm, 2 mm, 4 mm
(d) The excitation method: Using a vibration generating device (not shown), vibration is applied to the entire system including all the elements shown in FIG. 1, including the wire harness WH, and the vibration frequency is varied as appropriate.

(e) The method for measuring the terminal sliding distance: The distance, in the terminal axial direction, from a predetermined portion of the connector terminal 32 connected to the first exposed portion to a predetermined portion of the counterpart connector 40 corresponding to the connector terminal 32 is measured.

Figure 6:
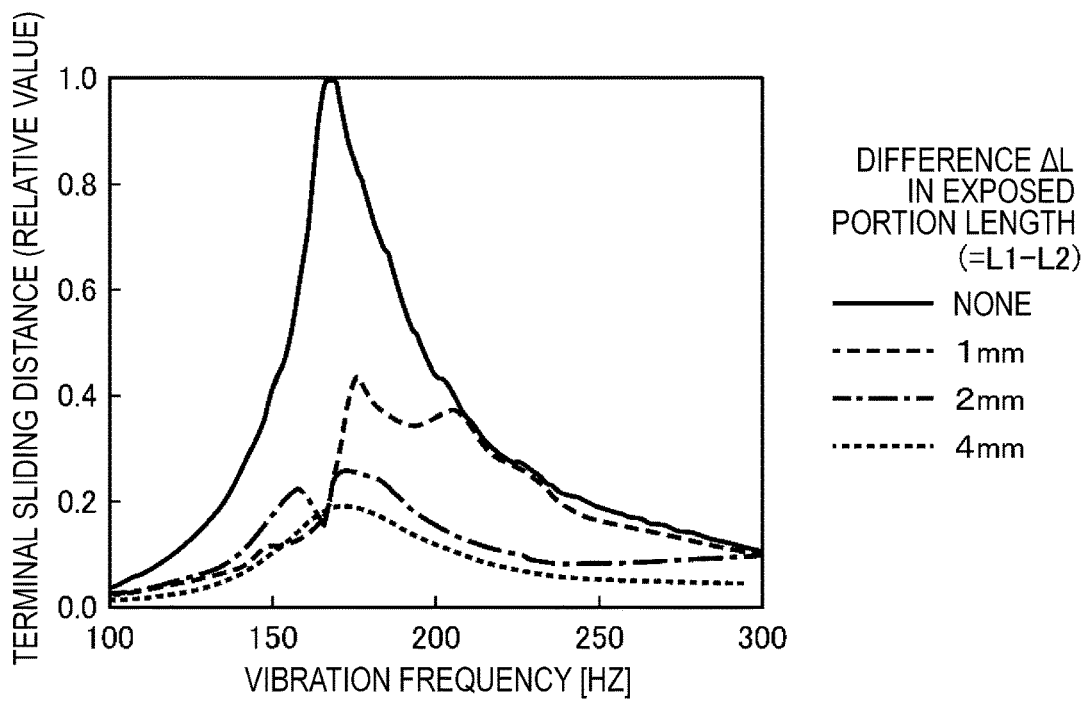
FIG. 6 is a graph showing a relationship between the vibration frequency and the terminal sliding distance obtained for the length of the exposed portion of each wire in Example 1.
Figure 7:
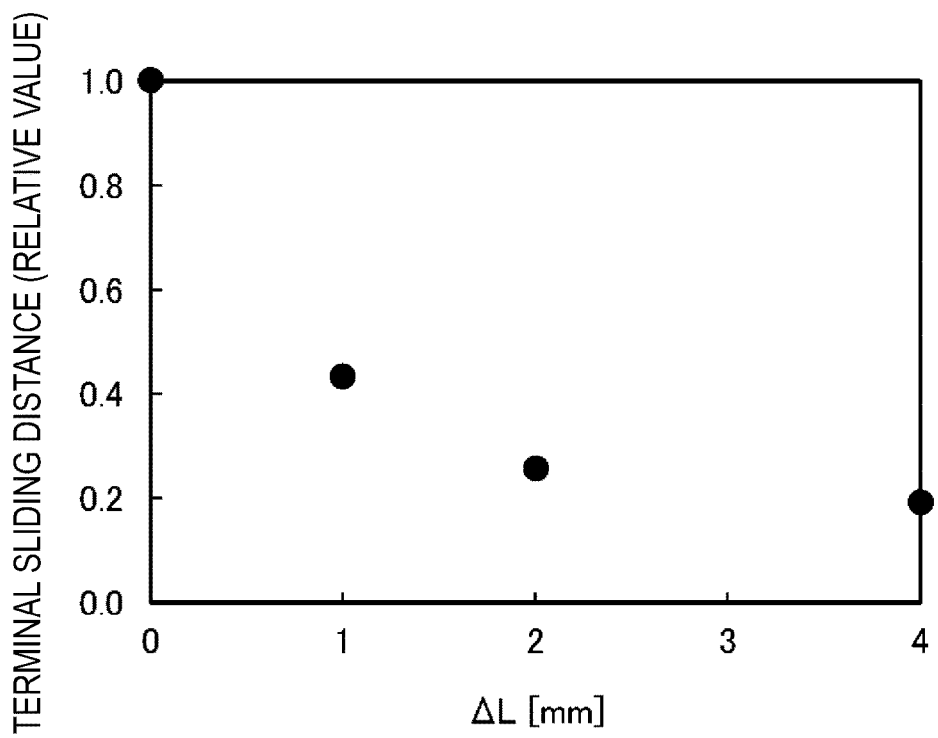
FIG. 7 is a graph showing the maximum value of the terminal sliding distance obtained for the length of the exposed portion of each wire in Example 1.

The results of the measurement are shown in FIGS. 6 and 7. FIG. 6 shows a relationship between the vibration frequency and the terminal sliding distance, and FIG. 7 shows a relationship between the length difference ΔL and the maximum value of the terminal sliding distance. As shown in FIG. 6, the terminal sliding distance reaches a peak within a predetermined vibration frequency range (range including the resonance frequency of the wire harness), independently of the length difference ΔL. However, the maximum value of the terminal sliding distance decreases with an increase in the length difference ΔL (=L1−L2), as shown in FIG. 7. The reason is presumably that the difference between the two sags δ1 and δ2 caused by a reduction of the sag δ1 of the first exposed portion and an increase of the sag δ2 of the second exposed portion as the wire bundle exposed portion 10*a* undergoes bending is cancelled out by an amount corresponding to the length difference ΔL, as a result of which the tensions generated in the first and second exposed portions are made uniform.

Example 2

Figure 8:
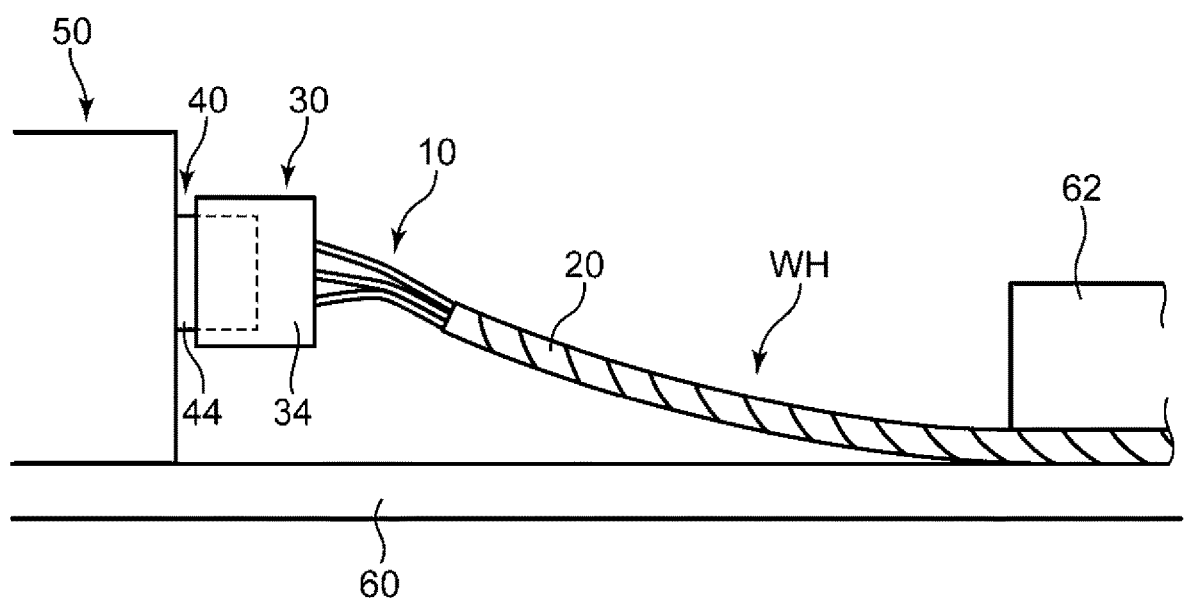
FIG. 8 is a side view showing a facility for obtaining a relationship between the vibration frequency and the terminal sliding distance in Example 2.

The wire harness WH according to the embodiment was routed in a configuration different from the routing configuration shown in FIG. 1, and the terminal sliding distance of the connector terminal 32 connected to the first exposed portion was measured in the same manner as in Example 1. Specifically, as shown in FIG. 8, while the connector 30 of the wire harness WH was held at a position above a base 60, the intermediate portion of the wire harness WH was pressed onto the base 60 by a pressing member 62, thus applying downward bending to the wire bundle exposed portion 10*a*. In this state, vibration was applied to the whole system including the wire harness WH.

Figure 9:
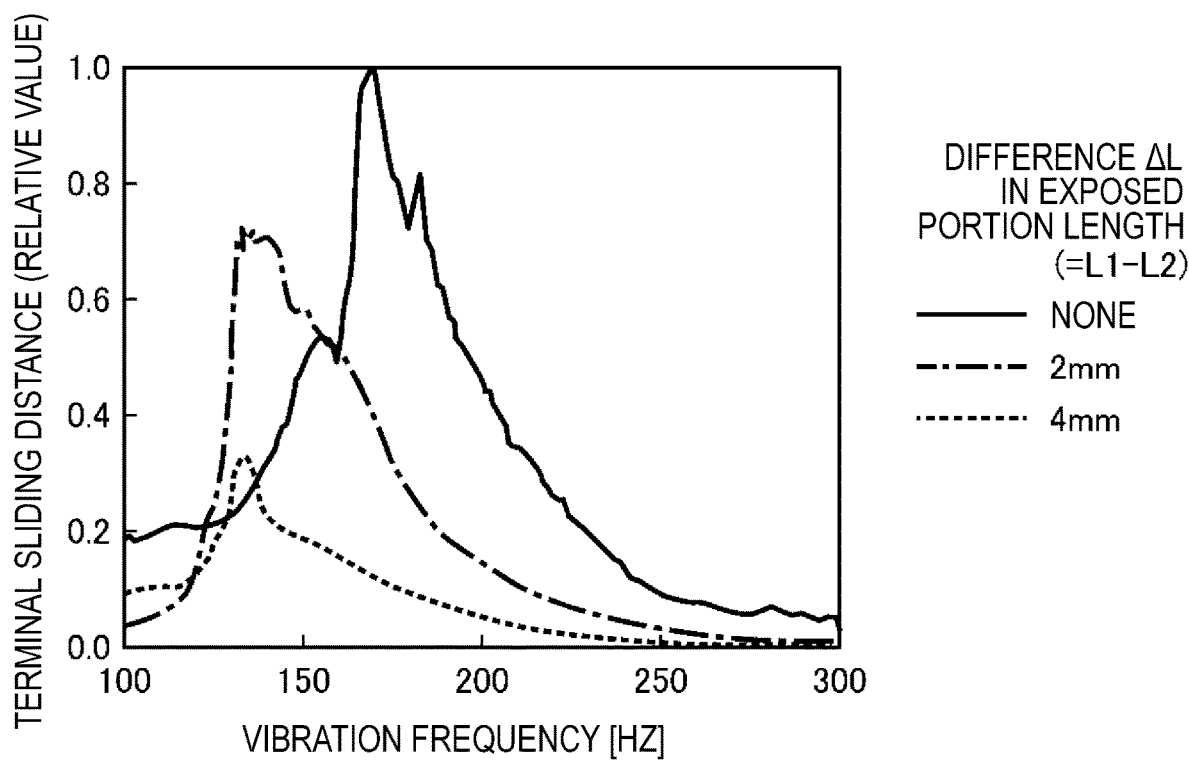
FIG. 9 is a graph showing a relationship between the vibration frequency and the terminal sliding distance obtained for the length of the exposed portion of each wire in Example 2.
Figure 10:
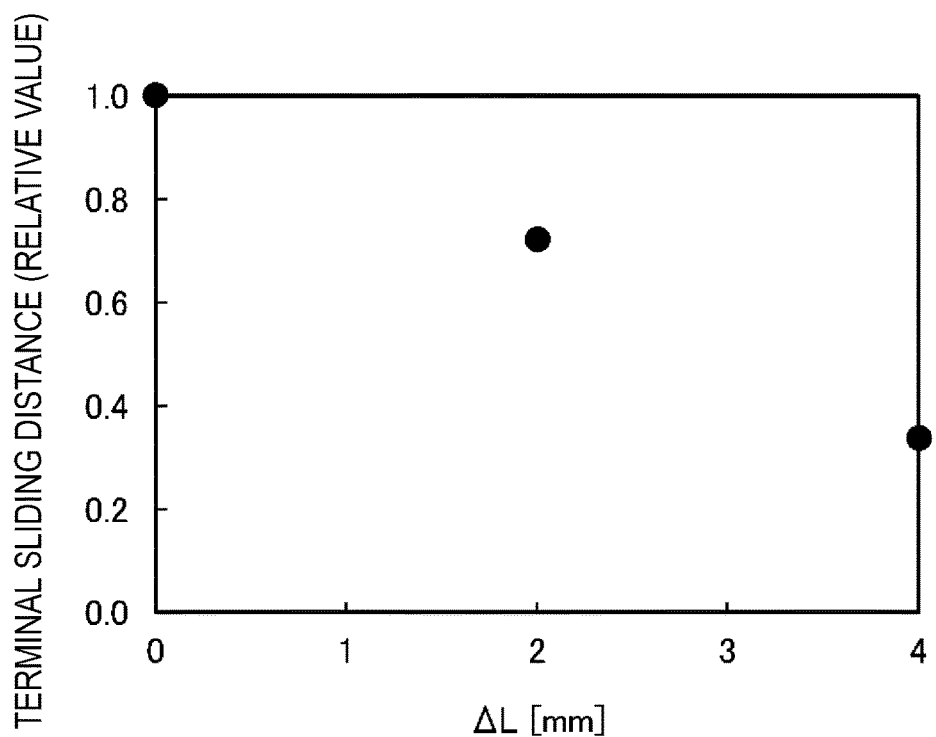
FIG. 10 is a graph showing the maximum value of the terminal sliding distance obtained for the length of the exposed portion of each wire in Example 2.

The results of the measurement are shown in FIGS. 9 and 10. FIG. 9 shows a relationship between the vibration frequency and the terminal sliding distance of the connector terminal 32, and FIG. 10 shows a relationship between the length difference ΔL and the maximum value of the terminal sliding distance. As in the case of Example 1, the terminal sliding distance reaches a peak within a predetermined vibration frequency, independently of the length difference ΔL, as shown in FIG. 9. However, as shown in FIG. 10, the maximum value of the terminal sliding distance decreases with an increase in the length difference ΔL (=L1−L2). This result teaches that the effect of suppressing the terminal sliding distance of the connector terminal connected to the first exposed portion is not limited to a wiring configuration as shown in FIG. 1, and can be achieved by providing an appropriate difference ΔL between the length L1 and the length L2 of the first exposed portion and the second exposed portion located on both outer side in the specific bending direction.

What is claimed is:

1. A wire harness that can be used for electrical connection inside a vehicle, the wire harness comprising:
   a plurality of wires that are bundled together to form a wire bundle;
   a connector that is provided at an end of the wire bundle, the connector including a plurality of connector terminals that are to be respectively mounted to ends of the plurality of wires, and a connector housing configured to hold the plurality of connector terminals in a state in which the plurality of connector terminals are arranged in a direction orthogonal to a terminal axial direction, which is an axial direction of the plurality of connector terminals; and
   a restraining tape that is to be wrapped around the wire bundle, thereby restraining the plurality of wires so as to restrict relative axial displacement between the plurality of wires, wherein:
   the restraining tape includes a tape end at a position that is distant from the connector housing in a length direction of the wire bundle,
   the wire bundle includes a wire bundle exposure that is exposed between the connector housing and the tape end without being subjected to restraint by the restraining tape,
   the plurality of wires include a first wire and a second wire that are respectively located on both outer sides in a specific bending direction, the specific bending direction being orthogonal to the terminal axial direction,
   the wire harness is configured to be routed inside the vehicle in a state in which a position of the connector is fixed, and bending in the specific bending direction occurs in the wire bundle exposure so as to reduce sag of a first exposure, which is a portion of the first wire that forms a part of the wire bundle exposure, and to increase sag of a second exposure, which is a portion of the second wire that forms a part of the wire bundle exposure, relative to a reference state in which the terminal axial direction and an axial direction of the wire bundle at the tape end are parallel to each other,
   the first exposure has a length greater than a length of the second exposure so as to reduce a difference in sag between the second exposure and the first exposure that is caused by a reduction of the sag of the first exposure and an increase of the sag of the second exposure, from the reference state, and
   the plurality of connector terminals are arranged in a plurality of stages aligned in the specific bending direction, the connector terminals are respectively disposed at a plurality of positions aligned in a direction orthogonal to both the specific bending direction and the terminal axial direction in each of the plurality of stages, the first wire is a wire connected to each of the connector terminals included in one of the plurality of stages that is located outermost in curvature radius direction of the wire bundle exposure, and the second wire is a wire connected to each of the connector terminals included in one of the plurality of stages that is located innermost in the curvature radius direction.

2. The wire harness according to claim 1, wherein the plurality of wires further include at least one intermediate wire located between the first wire and the second wire in the specific bending direction, and an intermediate wire exposure, which is a portion of the intermediate wire that forms a part of the wire bundle exposure, has a length less than or equal to the length of the first exposure.

3. The wire harness according to claim 1, wherein the wire harness is configured to be routed such that the wire bundle exposure is located inside an engine room of the vehicle.

4. A wire harness that can be used for electrical connection inside a vehicle, the wire harness comprising:
   a plurality of wires that are bundled together to form a wire bundle;

a connector that is provided at an end of the wire bundle, the connector including a plurality of connector terminals that are to be respectively mounted to ends of the plurality of wires, and a connector housing configured to hold the plurality of connector terminals in a state in which the plurality of connector terminals are arranged in a direction orthogonal to a terminal axial direction, which is an axial direction of the plurality of connector terminals; and a restraining tape that is to be wrapped around the wire bundle, thereby restraining the plurality of wires so as to restrict relative axial displacement between the plurality of wires, wherein:

the restraining tape includes a tape end at a position that is distant from the connector housing in a length direction of the wire bundle, the wire bundle includes a wire bundle exposure that is exposed between the connector housing and the tape end without being subjected to restraint by the restraining tape, the plurality of wires include a first wire and a second wire that are respectively located on both outer sides in a specific bending direction, the specific bending direction being orthogonal to the terminal axial direction, the wire harness is configured to be routed inside the vehicle in a state in which a position of the connector is fixed, and bending in the specific bending direction occurs in the wire bundle exposure so as to reduce sag of a first exposure, which is a portion of the first wire that forms a part of the wire bundle exposure, and to increase sag of a second exposure, which is a portion of the second wire that forms a part of the wire bundle exposure, relative to a reference state in which the terminal axial direction and an axial direction of the wire bundle at the tape end are parallel to each other, the first exposure has a length greater than a length of the second exposure so as to reduce a difference in sag between the second exposure and the first exposure that is caused by a reduction of the sag of the first exposure and an increase of the sag of the second exposure, from the reference state, and the wire harness is configured to be routed in a state in which an intermediate portion of the wire harness causes downward bending in the wire bundle exposure by sagging downward by a weight of the wire bundle exposure, the first wire is one of the plurality of wires that is located uppermost, and the second wire is one of the plurality of wires that is located lowermost.

5. A device for establishing electrical connection inside a vehicle, the device comprising:

a wire harness, the wire harness comprising:
   a plurality of wires that are bundled together to form a wire bundle;
   a connector that is provided at an end of the wire bundle, the connector including a plurality of connector terminals that are to be respectively mounted to ends of the plurality of wires, and a connector housing configured to hold the plurality of connector terminals in a state in which the plurality of connector terminals are arranged in a direction orthogonal to a terminal axial direction, which is an axial direction of the plurality of connector terminals; and
   a restraining tape that is to be wrapped around the wire bundle, thereby restraining the plurality of wires so as to restrict relative axial displacement between the plurality of wires, wherein:
   the restraining tape includes a tape end at a position that is distant from the connector housing in a length direction of the wire bundle,
   the wire bundle includes a wire bundle exposure that is exposed between the connector housing and the tape end without being subjected to restraint by the restraining tape,
   the plurality of wires include a first wire and a second wire that are respectively located on both outer sides in a specific bending direction, the specific bending direction being orthogonal to the terminal axial direction,
   the wire harness is configured to be routed inside the vehicle in a state in which a position of the connector is fixed, and bending in the specific bending direction occurs in the wire bundle exposure so as to reduce sag of a first exposure, which is a portion of the first wire that forms a part of the wire bundle exposure, and to increase sag of a second exposure, which is a portion of the second wire that forms a part of the wire bundle exposure, relative to a reference state in which the terminal axial direction and an axial direction of the wire bundle at the tape end are parallel to each other, and
   the first exposure has a length greater than a length of the second exposure so as to reduce a difference in sag between the second exposure and the first exposure that is caused by a reduction of the sag of the first exposure and an increase of the sag of the second exposure, from the reference state;

a connector holder configured to hold the connector of the wire harness or a counterpart connector that is to be coupled to the connector so as to fix a position of the connector; and a wire bundle holder configured to hold the wire bundle at a position distant from the connector holder in a state in which bending in the specific bending direction occurs in the wire bundle exposure so as to reduce sag of a first exposure, which is a portion of the first wire that forms a part of the wire bundle exposure, and to increase sag of a second exposure, which is a portion of the second wire that forms a part of the wire bundle exposure, from the reference state of the wire harness.

6. A method for routing a wire harness inside a vehicle, comprising the steps of:

preparing a wire harness, the wire harness comprising:
   a plurality of wires that are bundled together to form a wire bundle;
   a connector that is provided at an end of the wire bundle, the connector including a plurality of connector terminals that are to be respectively mounted to ends of the plurality of wires, and a connector housing configured to hold the plurality of connector terminals in a state in which the plurality of connector terminals are arranged in a direction orthogonal to a terminal axial direction, which is an axial direction of the plurality of connector terminals; and
   a restraining tape that is to be wrapped around the wire bundle, thereby restraining the plurality of wires so as to restrict relative axial displacement between the plurality of wires, wherein:
   the restraining tape includes a tape end at a position that is distant from the connector housing in a length direction of the wire bundle, the wire bundle includes a wire bundle exposure that is exposed between the connector housing and the tape end without being subjected to restraint by the restraining tape, the plurality of wires include a first wire and a second wire that are respectively located on both outer sides in a specific bending direction, the specific bending direction being orthogonal to the terminal axial direction, the wire harness is configured to be routed inside the vehicle in a state in which a position of the connector is fixed, and bending in the specific bending direction occurs in the wire bundle exposure so as to reduce sag of a first exposure, which is a portion of the first wire that forms a part of the wire bundle exposure, and to increase sag of a second exposure, which is a portion of the second wire that forms a part of the wire bundle exposure, relative to a reference state in which the terminal axial direction and an axial direction of the wire bundle at the tape end are parallel to each other, and the first exposure has a length greater than a length of the second exposure so as to reduce a difference in sag between the second exposure and the first exposure that is caused by a reduction of the sag of the first exposure and an increase of the sag of the second exposure, from the reference state; and routing the wire harness inside the vehicle in a state in which a position of the connector in the wire harness is fixed, and bending occurs in the wire bundle exposure in the specific bending direction so as to increase sag of a first exposure serving as the exposure of the first wire, and to reduce sag of a second exposure serving as the exposure of the second wire, from the reference state.

* * * * *